United States Patent Office 3,369,611
Patented Feb. 20, 1968

3,369,611
PITCH MECHANISM LOCK FOR MAIN
HELICOPTER ROTOR BLADE
Luigi Vacca, Milford, Donald L. Ferris, Newtown, and
Robert Zincone, Stamford, Conn., assignors, by mesne
assignments, to the United States of America as represented by the Secretary of the Navy
Filed Apr. 27, 1967, Ser. No. 635,329
4 Claims. (Cl. 170—160.12)

ABSTRACT OF THE DISCLOSURE

A locking mechanism for restraining the blade pitch adjusting mechanism and blade of a rotary wing aircraft when the blade is folded for storage of the aircraft; the locking mechanism incorporates a splined sleeve which is disposed internally of the pitch adjusting mechanism for engagement with complementary mating splined portions of the blade hinge structure and of the pitch adjusting mechanism. The locking mechanism further incorporates a hydraulically controlled actuation mechanism for remotely controlled actuation thereof.

Background of the invention

This invention relates to rotary wing aircraft blade pitch mechanisms and more particularly to a mechanism for locking the blade pitch adjusting mechanism associated with the hinge joints of the main rotor blades prior to the folding of the rotary blades of such aircraft for storage purposes.

When rotary wing aircraft, such as helicopters, are used on surface ships, for example aircraft carriers, it is necessary to fold the rotary blades in order that the helicopter may be carried below deck on elevators of standard size and in order to minimize storage area requirements. The folding and unfolding of rotary blades must usually be accomplished while the ship is under way and frequently with the ship travelling at relatively high speeds. This operation must be accomplished quickly and with ease. Prior to folding the rotor blades of the rotary wing assembly, it is necessary to lock the pitch control mechanism in a neutral position or a predetermined attitude in order to facilitate proper positioning of the blade hinge and to insure that the folded blades will not shift in position during movement of the aircraft over the deck of the ship or during movement thereof on the elevators of the aircraft carrier.

Field of the invention

The instant invention is well adapted for utilization with rotary wing drive mechanisms of the general character disclosed in U.S. Patents 2,925,130 and 3,097,701 which issued to Michel D. Buivid.

Description of the prior art

The structure for locking the blade pitch adjusting mechanism in apparatus embodying the teaching of the aforementioned patents incorporates an aligned bore in each of two abutting plate members which are adapted to be locked in the aligned position by a linearly actuated locking pin which moves into and out of locking position in accordance with the locked or unlocked condition of the pitch control mechanism, respectively, when the blades are folded or unfolded as the case may be. The actuating mechanism for the linearly moveable locking pin may be in the nature of a hydraulic piston or actuator having a fluid actuated plunger attached to the pin. Similarly an electrical solenoid type device would provide an analogous function. The locking pin actuating mechanism utilized in the aforementioned prior art types of locking mechanisms is, however, disposed on an exterior portion of the collar of the usual blade horn at the inboard end of the blade folding hinge assembly in a position where it is subjected to the airstream during rotation of the rotary wings of the aircraft. This protrusion of structure produces turbulence of the air and a resistive loading during wing rotation.

Summary of the invention

The instant invention is directed to an improved locking arrangement of a nature wherein the locking mechanism is incorporated within the housing of the blade pitch adjusting mechanism to thereby provide a more aerodynamically clean configuration for the blade and rotor assembly; hence, improved rotor blade performance is provided. The actuating arrangements for the blade folding mechanism may be hydraulically or pneumatically controlled and disposed interiorly of the hinge and pitch adjusting assembly. Another hydraulically actuated mechanism functions to provide linear movement of an internally and externally splined sleeve which is disposed internally of the outer portion of the pitch adjusting mechanism; as a result of the movement, the internal splines engage with a mating splined portion of, or externally cut gear teeth carried by, a complementary portion of the blade hinge structure. The blade hinge structure, incorporating the hydraulic controls, is thereby locked to the blade pitch adjusting mechanism by mating engagement of the external splines of the sleeve with an additional complementary splined portion of, or internally cut spur type gear carried by, the blade pitch adjusting mechanism.

It is a feature of the instant invention to provide an improved locking mechanism wherein the blade pitch adjusting mechanism of the rotor assembly of a rotary wing aircraft is locked during conditions when the rotor blades are desired to be hinged to a folded position and wherein the pitch control mechanism is unlocked to permit blade pitch adjustment when the blades are in the unfolded and operative condition thereof.

One object of the instant invention resides in the provision of an improved mechanism which provides for a more aerodynamically clean mechanical configuration for the main rotor pitch locking assembly of rotary wing aircraft and in which the disadvantages of prior art locking mechanisms, as located in the airstream paths in a manner producing air turbulence, are obviated.

Another object of this invention is to provide an improved mechanism for controlling the locking of the blade pitch adjusting mechanism, which locking function requires a minimum of additional elements in the blade pitch adjusting mechanism for accomplishment of the desired functions thereof.

A further object of this invention resides in the provision of improved actuating mechanisms for unlocking and locking the blade pitch adjusting mechanism of a rotary wing during conditions of operation and during storage situations, respectively, and in which latter situation the blades of the rotary wings of the assembly are disposed in a folded position.

Another object of the invention is to generally improve the aerodynamic configuration of the structure associated with the blade pitch adjusting mechanism for rotor blades of a rotary wing aircraft.

Other objects, advantages and novel features of the invention will become apparent from the following detailed description of the invention when considered in conjunction with the accompanying drawings wherein:

*Description of the preferred embodiment*

Figure 1:
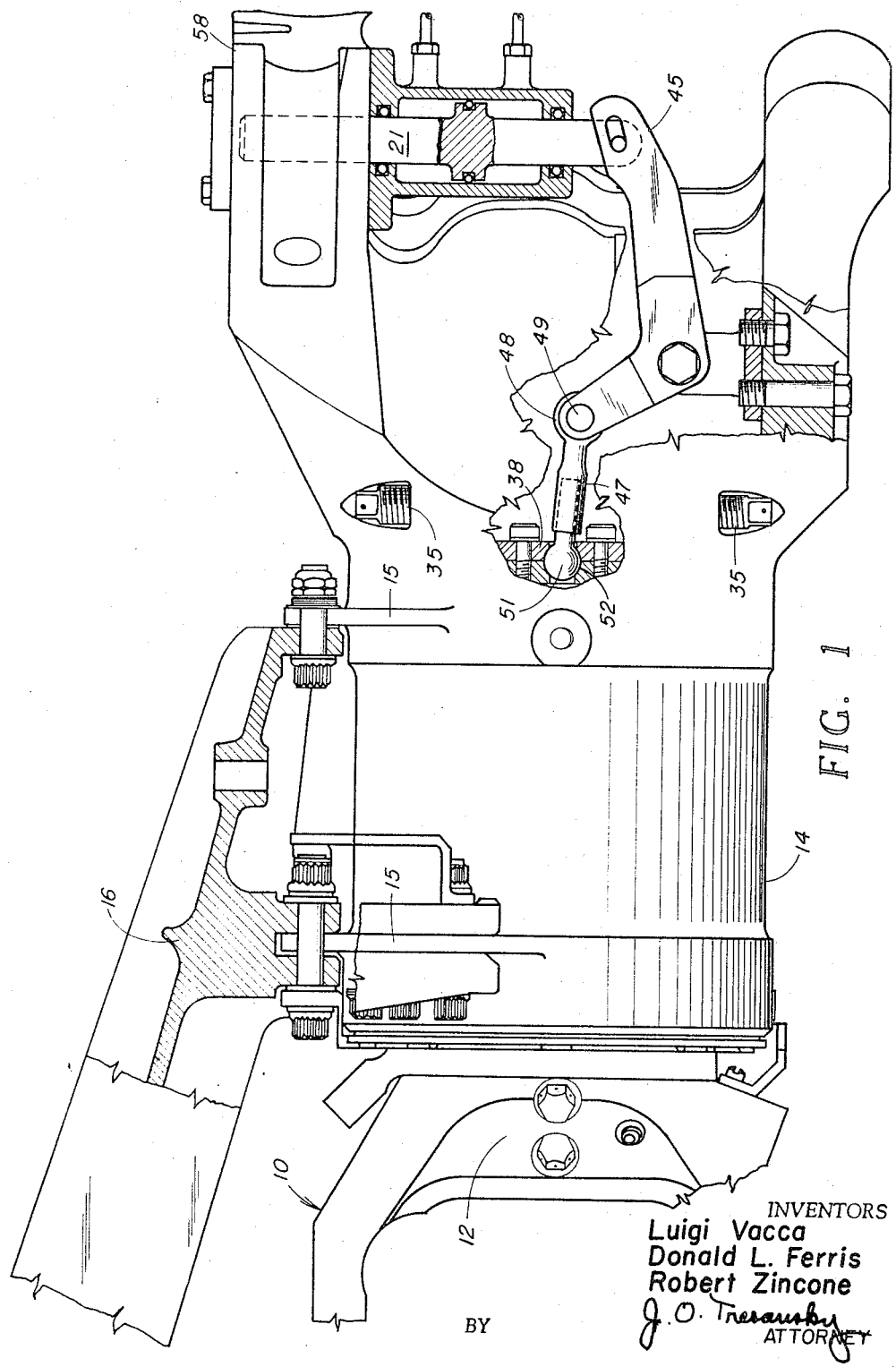
FIG. 1 is a plan view with portions thereof broken away and other portions thereof shown in section, illustrating certain of the internal details of the flapping link and blade pitch adjusting mechanism incorporating the pitch lock structure of the invention; and, FIG. 2 is an elevation view, with the upper portion thereof broken away and in section, of a locking mechanism of FIG. 1, according to a preferred embodiment of the instant invention.

Referring now to the drawings wherein like reference characters are utilized throughout the figures for designating like or similar elements of structure, a blade pitch control mechanism and hinge assembly are indicated generally at 10. The main sustaining rotor of the aircraft comprises spaced upper and lower plate members (not shown) carried by the main rotor drive shaft (not shown); between the upper and lower plate members there are disposed a plurality, for example five, generally conventional blade pitch adjusting mechanisms and hinge assemblies such as are indicated generally at 10. Each blade pitch adjusting mechanism and hinge assembly do not, individually, constitute the inventive concept of the instant invention and, accordingly, will be only briefly described herein. A spindle member or portion 12 of a flapping link 13 is pivotally mounted about a hinge pin (not shown) inserted through a bore 11 in flapping link 13 to provide for flapping movement about a generally horizontal flapping hinge and for movement in the plane of blade rotation about a generally vertical drag hinge. The flapping link 13, which carries the blade, is pivoted on the unshown hinge pin to thereby form a portion of the flapping hinge. The flapping link 13 has a cylindrical spindle member 12, FIGS. 1 and 2, which extends axially from the blade and on which the blade is journalled for pitch changing movement. The spindle member or portion 12 of the flapping link 13 is formed as a cylinder having a smooth external surface on which a plurality of bearings, such for example as ball and ball race assemblies 14, are fixed to permit rotation of the blades for pitch changing movement.

A pair of collar members or bosses 15, FIG. 1, are spaced along the inboard end of the blade flapping hinge mechanism. The collars 15 carry a conventional blade horn 16 for changing the pitch of the blades by rotation thereof. The flapping link 13 and the collars 15, when conditioned for folding of the blades, must be maintained in a fixed relationship with respect to each other; this is accomplished by the pitch locking mechanism of the instant invention as hereinafter described in greater detail.

A horn 16 on collars 15, FIG. 1, is connected for universal movement at the upper end thereof to the lower end of an actuation rod (not shown), the upper end of which is connected by a clevis (not shown) to the rotatable lug extremity of an actuation arm (not shown) fixed to the rocker shaft (also not shown) of the pitch change mechanism of the rotor assembly. The details of all of the foregoing structure and connection thereof are conventional as described in greater detail in the aforementioned U.S. Patent 3,097,701 to Buivid.

Figure 2:
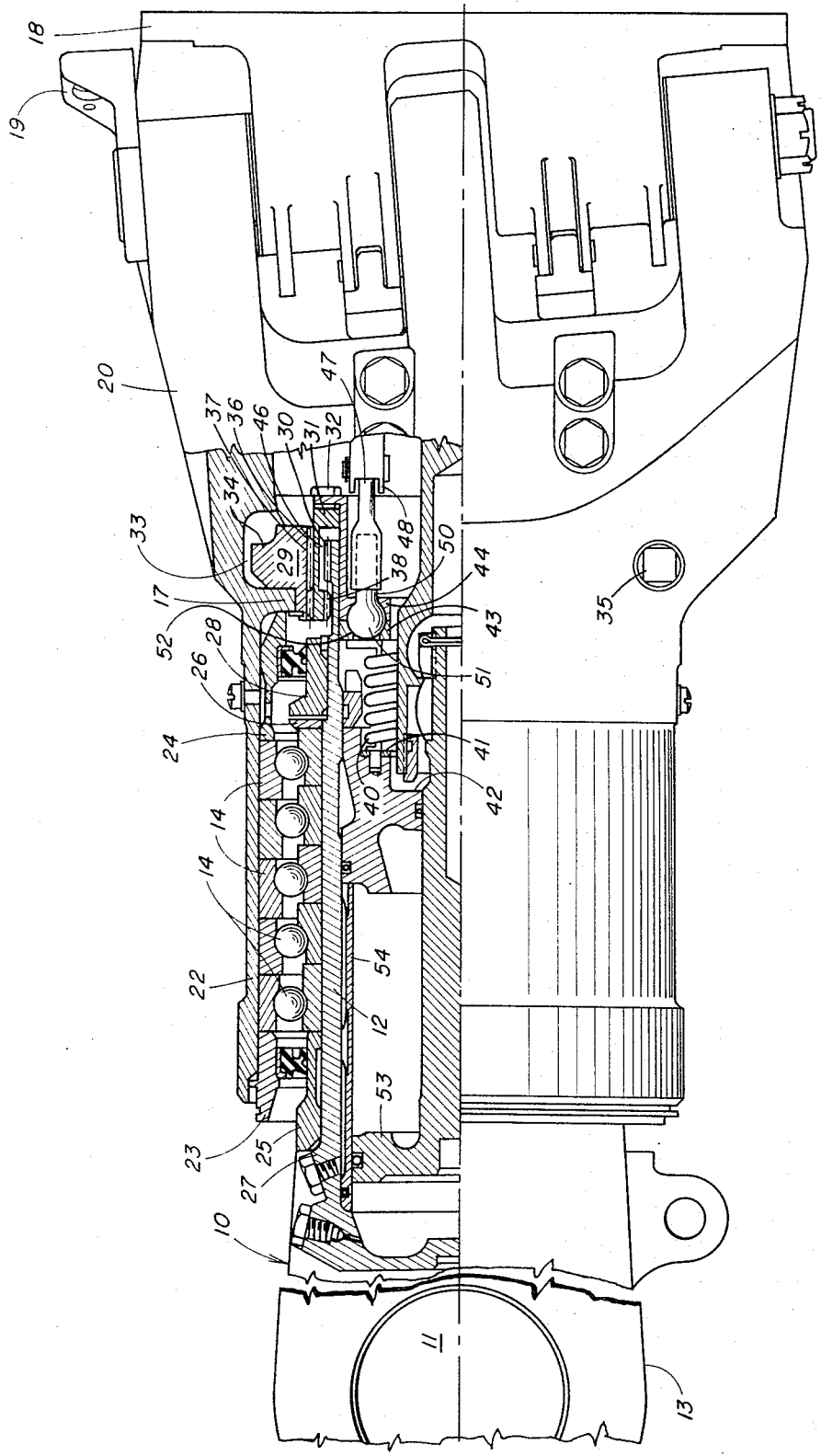

Each blade (not shown) is attached to a drag hinge 20 at an outboard hinge portion 18 to which the blade is bolted at flange 19. The inboard portion of the hinge 20 is terminated in the form of a cylindrical sleeve portion 22. This sleeve is journalled on the blade spindle member 12 by a plurality of ball bearing assemblies 14, as illustrated in FIG. 2. The particular details of the hinge portions 18 and 22, as well as the hinge pin, for retaining these portions of the mechanism, form no part of the instant invention. The projections 58 of the sleeve 22 are disposed to permit hinging and latching of the blades in a manner such that the hinges are latched for the operative position of the blades and unlatched and folded when the blades are disposed for storage. The latching and unlatching of the blade may be accomplished in any conventional manner such as, for example, by the technique shown by the aforementioned patents to Buivid. The inboard end of the sleeve portion 22 of each of the pitch adjusting mechanisms for the individual blades is positioned over the aforementioned group of bearings 14 and is provided with a smooth internal surface which is fixed as by press fitting to the bearing races. The outer race is fixed to the internal surface of the sleeve 22 between spacer member 24 and the locking ring 23 while the inner races of the bearing assembly are fixed to the external surface of the spindle 12 between a spacer member 25 and a second spacer member 26. The spacer member 25 abuts against the flange portion 27 located at the base of the spindle 12 and the spacer member 26 is engaged by a spanner or torque nut 28 at the outer terminal end thereof. The sleeve 22 has an internally extending flange portion 17 to which an adjustable pitch adjuster member or collar 29 is mounted in a manner to be described. A fixed external or male splined portion 30 on spindle member 12 is disposed to be engaged by a pitch lock sleeve 31 fixed to support assembly 44 by means of bolts 32.

The outboard end of the sleeve 22 is provided with a generally annular recess 33 for the pitch adjuster member 29. This adjuster member 29 is provided with a pair of ears or projections 34 which are disposed to be engaged by adjusting screws 35 for the purpose of fixing the angular orientation of the sleeve 22 relative to internally cut splines or gear teeth 36 disposed at the inner periphery of the pitch adjuster member 29.

The internal female splines 36 on pitch adjuster member 29 mate with external or male pitch lock splines 37 carried by pitch lock sleeve 31. The pitch lock sleeve 31 has an additional female splined surface at the internal bore 38 thereof, for engagement with the male splined surface 30 on the spindle member 12, during conditions when the blade is folded.

Immediately prior to folding the blade, the outer sleeve 22, the pitch lock sleeve 31 and the spindle member 12 are locked together by linear movement of the pitch lock sleeve 31. Actuation of the dual splined pitch lock sleeve 31 is accomplished by energy from a compression spring 40. The compression spring 40 reacts against face 41 of a cylinder head 42 and against sleeve portion 43 of a sleeve support assembly 44 to which the pitch lock sleeve 31 is affixed as by means of the machine bolts or screws 32 as aforementioned. The locking movement of the locking sleeve 31 and the associated sleeve support assembly 44 is accomplished under spring biasing actuation when a pitch lock arm 45 is moved by downward movement of a blade lock pin 21, in a manner to be described hereafter.

The internal bore of the pitch locking sleeve 31 is provided with a stepped bore to provide an undercut portion at 46 as an interruption of the internal splines 38, thereby facilitating relative rotation between the splined pitch locking sleeve 31, the spindle 12 and sleeve 22 when the various elements are disposed according to the relationship indicated in FIG. 2. It will be apparent from FIG. 2, that upon linear actuation of the sleeve support assembly 44 by action of spring 40, the splines of 31 will move in a manner to slidably engage splines 36 and 30, thereby to effect the desired lock up between the spindle 12 and the outer sleeve 22, through the contemperaneous engagement existent between the splines of splined sleeve 31 and the splines 36 of the pitch adjuster member 29 as well as splines 30 of spindle 12.

The linkage between the crank arm 45 and the sleeve support assembly 44 includes an actuating rod 47 which is received at one end in a clevis portion 48 of crank arm 45 and retained for pivotal movement therein by a clevis pin 49. Actuating rod 47 is provided with an axial bore at the opposite end thereof for slidable engagement with one end of a piston rod 50 slidably inserted in the bore. The opposite end of piston rod 50 is provided with a ball portion 51 which is received in the ball socket 52 of sleeve support assembly 44, thereby providing a ball and socket joint of a character well known in the art. Movement of crank arm 45 may be provided by any conventional manner such as, for example, blade lock pin 21 which may be pneumatically or hydraulically actuated as shown in FIG. 1.

When it is desired to lock the blades for folding, blade lock pin 21 is actuated by suitable means to move in a downward direction as viewed in FIG. 1. The downward movement of pin 21 causes crank arm 45 to move clockwise, as seen in FIG. 1, thereby moving actuating rod 47 relative to piston rod 50 via the slidable connection therebetween. During such movement, piston rod 50 is rotated in its socket by actuating rod 47 so as to maintain the coaxial relationship therebetween. As actuating rod 47 begins to move away from piston rod 50 due to rotation of crank arm 45, compression spring 40 continues to bias support assembly 44 to the right, as shown in FIG. 1, thereby urging piston rod 50 into the bore in actuating rod 47 and also urging pitch lock sleeve 31 into its locked position.

The details of an internal piston 53 which moves within a cylinder liner 54 for actuation of a conventional blade folding mechanism forms no part of the instant invention. This structure which actuates linkages for movement of gear sectors for blade folding movement is of a nature generally similar to the construction disclosed in the Buivid patents supra.

In order to unlock the pitch lock mechanism of the instant invention, the blades are repositioned by hydraulically controlled actuation of the piston 53 to move the blades to the operative position thereof. Contemporaneously with the foregoing operations, the crank arm 45 is rotated counterclockwise, as seen in FIG. 1 to thereby release the locked up relationship of the mutually engaged splines. This action renders the sleeve 22 and spindle member 12 operative for pitch adjustment of the blades during rotor operation for aircraft flight.

Obviously many modifications and variations of the present invention are possible in light of the above teachings. It is therefore to be understood that within the scope of the appended claims the invention may be practiced otherwise than as specifically described.

What is claimed and desired to be protected by Letters Patent is:

1. In a bladed variable-pitch type rotor apparatus of a character incorporating a mechanism for selectively adjusting the pitch of a rotor blade, a flapping hinge and a folding hinge, wherein the flapping hinge and the folding hinge are operatively connected to said mechanism,
   means operatively interposed within said flapping hinge, said folding hinge, and said pitch controlling mechanism for locking a blade at a particular pitch.

2. The structure of claim 1 further comprising;
   an internally splined female member disposed to be fixed relative to said folding hinge,
   an externally splined male portion disposed on said flapping hinge in spaced contiguity to said internally splined female member, and
   a splined sleeve member having an internally splined section disposed to selectively matingly engage and disengage said externally splined male portion on said flapping hinge,
   said sleeve member further incorporating an externally splined segment disposed thereon in mating engagement with the splined portion of said internally splined female member.

3. The structure of claim 2 further comprising,
   actuating means for selectively positioning said splined sleeve member in mating engagement with said externally splined male portion on said flapping hinge for pitch mechanism locking during blade folding conditions of the rotor apparatus and out of mating engagement therebetween during normal rotor operation.

4. The apparatus of claim 3 wherein said means for selectively positioning said splined sleeve member comprises;
   actuation means of a character adapted for actuation control by a remotely disposed intiation device.

References Cited
UNITED STATES PATENTS

| | | | |
|---|---|---|---|
| 2,925,130 | 2/1960 | Buivid | 170—160.12 |
| 3,097,701 | 7/1963 | Buivid | 170—160.12 |
| 3,101,785 | 8/1963 | Leoni | 170—160.12 |

EVERETTE A. POWELL, JR., *Primary Examiner.*